No. 661,120. Patented Nov. 6, 1900.
G. FAJEN.
ROTARY METER.
(Application filed July 18, 1900.)
(No Model.) 2 Sheets—Sheet 1.

No. 661,120. Patented Nov. 6, 1900.
G. FAJEN.
ROTARY METER.
(Application filed July 18, 1900.)
(No Model.) 2 Sheets—Sheet 2.
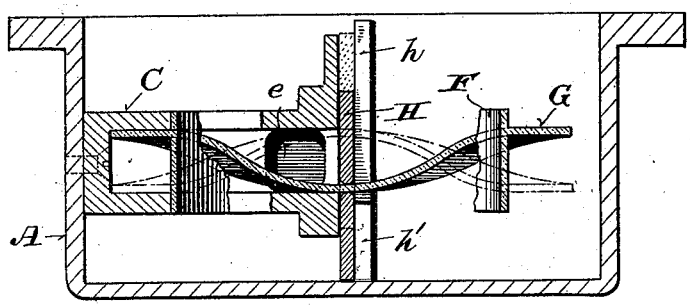
Fig. 3.
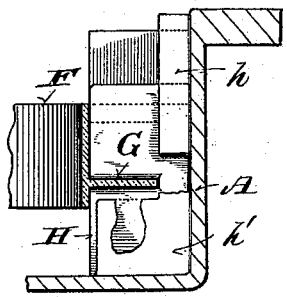
Fig. 4.
Fig. 5.
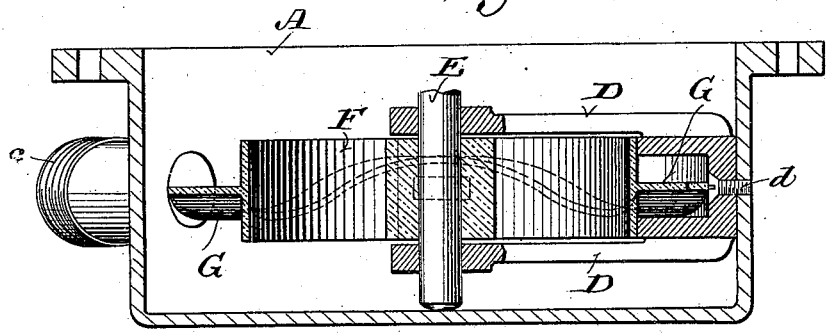
Fig. 6.
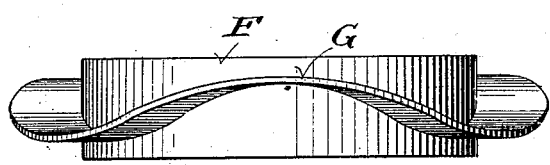
Witnesses:
Geo. W. Young
N. E. Oliphant
Inventor
Gustav Fajen,
H. G. Underwood.
By

UNITED STATES PATENT OFFICE.

GUSTAV FAJEN, OF MILWAUKEE, WISCONSIN.

ROTARY METER.

SPECIFICATION forming part of Letters Patent No. 661,120, dated November 6, 1900.

Application filed July 18, 1900. Serial No. 24,008. (No model.)

*To all whom it may concern:*

Be it known that I, GUSTAV FAJEN, a citizen of the United States, and a resident of Milwaukee, in the county of Milwaukee and State of Wisconsin, have invented certain new and useful Improvements in Rotary Meters; and I do hereby declare that the following is a full, clear, and exact description thereof.

My invention has for its object to provide simple, economical, and accurate rotary meters especially designed for measuring water; and it consists in certain peculiarities of construction and combination of parts hereinafter particularly set forth with reference to the accompanying drawings and subsequently claimed.

Figure 1:
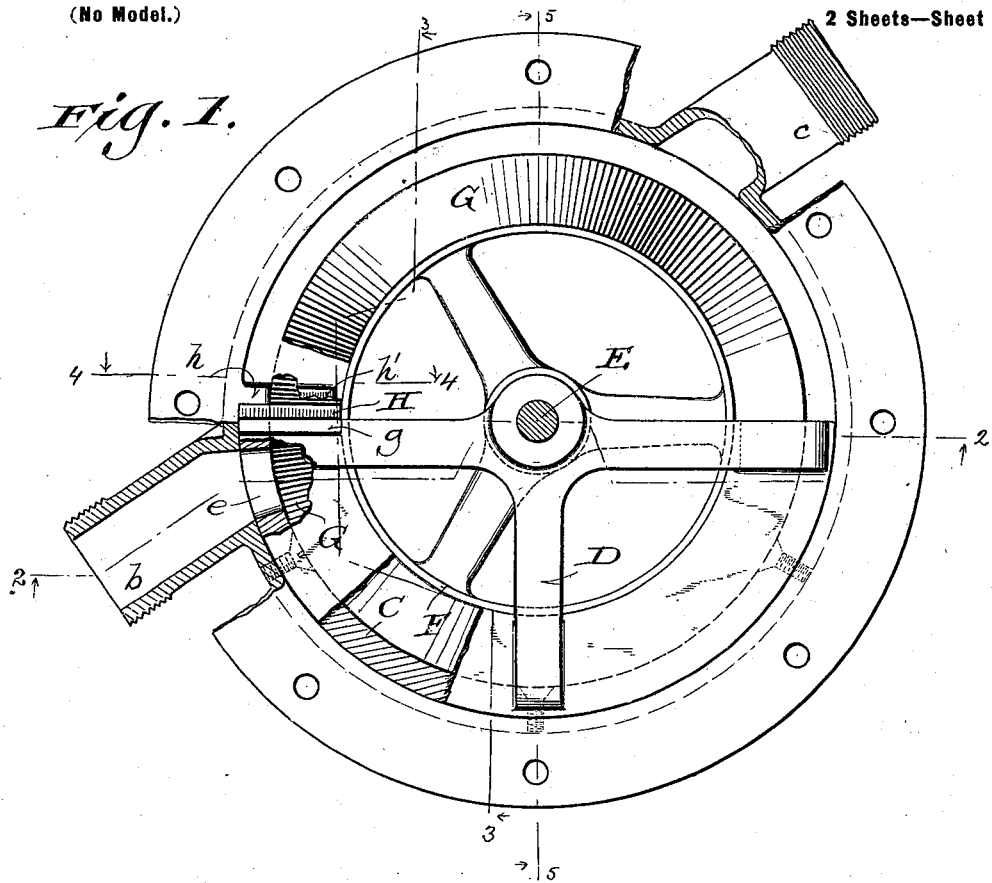
Figure 2:
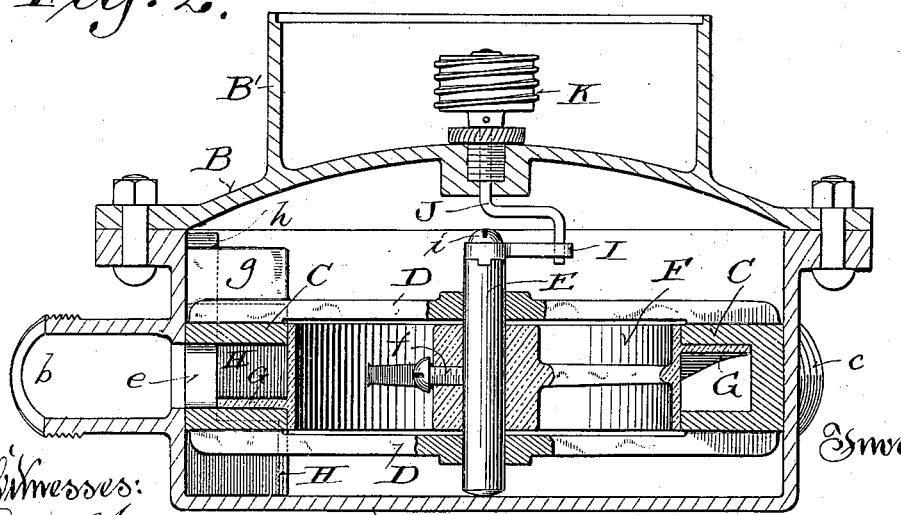

Figure 1 of the drawings represents a plan view of the lower portion of my improved rotary meter, partly broken and in horizontal section; Fig. 2, a vertical transverse sectional view of the meter, this view being indicated by lines 2 2 in the preceding figure; Figs. 3, 4, and 5, detail sectional views respectively indicated by lines 3 3, 4 4, and 5 5 in the first figure; and Fig. 6, an elevation of the rotary drum element of said meter provided with an exterior continuous wave-flange.

Referring by letter to the drawings, A indicates the lower section of a cylindrical pot-like casing, and bolted to an upper continuous outer flange of this section is the upper or cover section B of said casing, the joint between these sections being made watertight in practice. The lower section of the casing is provided with an inlet-nozzle $b$ and an outlet-nozzle $c$, both made to have screw-thread connection with pipe through which water or other liquefied fluid is conveyed.

Set in the lower section of the casing and made fast thereto by screws $d$ or other suitable means is a trough C, concentric with said casing and having a wall-port $e$ in register with the aforesaid inlet-nozzle, said trough being open at its ends and inner side. Upper and lower brackets D, extending inward from the trough, are apertured in line with the axis of the casing to form bearings for a vertical spindle E, having a rounded lower end at rest on the bottom of said casing. Adjustably connected to the spindle is the hub of a drum F, that faces the open side of the trough, and a continuous wave-flange G upon the periphery of the drum extends into said trough the full width of same. Various means may be employed in practice for securing the drum in vertically-adjustable position with respect to the spindle, a set-screw $f$ run in the drum-hub against said spindle being herein shown as one practical way of accomplishing the desired result, the adjustment being only such as will insure of the wave-flange G having movement in trough C without friction. That end of the trough C adjacent to port $e$ in register with nozzle $b$ is provided with an upwardly-extending flange $g$, parallel to a vertical inner rib $h$ of casing-section A, the lower portion $h'$ of the rib being of greater width than the remainder. Guided between the trough-flange and casing-rib is a gate H, having a horizontal recess therein engaged by the wave-flange G of drum F, the flange-opposing edges of the recess being preferably rounded or tapered to present the least possible frictional resistance, and it will be understood that said gate constitutes a reciprocative dam for that end of the trough adjacent to the casing-inlet.

In tongue-and-groove connection with the upper end of spindle E is a striker I, held in place by a set-screw $i$, and this striker operates against the lower crank-arm of another spindle J, having its bearing in the upper casing-section B, central of same. A worm-pinion K, shown in rigid connection with crank-spindle J, is operative as part of the gearing of an ordinary multiplying register mechanism, and in practice this mechanism is set within the space bounded by the annular flange B', herein shown on the aforesaid upper casing-section.

The elevations and depressions of the wave-flange G on periphery of drum F are equal, and pressure of water or other liquefied fluid flowing against these elevations and depressions causes rotation of said drum and its spindle E to operate the register mechanism, a predetermined quantity of the fluid being passed through the meter at each turn of the aforesaid drum after the space in said meter is once filled with said fluid.

The contour of the wave-flange of the drum is such that there is always pressure thereon when the fluid is flowing, this pressure being either on the upper or lower side of the flange or upon both sides thereof, according as it has travel past the trough-port *e* in register with the inlet-nozzle of the casing aforesaid.

While I have shown trough C as a separable element of my improved meter, it is practical to make all but the top of said trough integral with the lower casing-section A and provide for fastening said top in place, suitable provision being also had for the set of spindle E, these being mere mechanical variations that in no way affect the generic scope of my invention.

Having thus described my invention, what I claim as new, and desire to secure by Letters Patent, is—

1. A rotary meter comprising a separable cylindrical casing having an inlet and outlet, a trough in the casing concentric therewith clear of said outlet but having communication with said inlet, a spindle having its bearings in said casing central of the same, means in conjunction with the spindle for operating register mechanism, a trough-facing drum fast on said spindle, a continuous wave-flange on the periphery of the drum engaging the trough, and a loose gate provided with a recess engaged by the drum-flange, this gate being guided in the casing opposite the end of said trough adjacent to the aforesaid inlet.

2. A rotary meter comprising a separable cylindrical casing having an inlet and outlet, a trough in the casing concentric therewith clear of said outlet but having communication with said inlet, upper and lower brackets extending inward from the trough, a spindle having its bearings in the brackets central of said casing, means in conjunction with the spindle for operating register mechanism, a trough-facing drum fast on said spindle, a continuous wave-flange on the periphery of the drum engaging the trough, and a loose gate provided with a recess engaged by the drum-flange, this gate being guided in the casing opposite the end of said trough adjacent to the aforesaid inlet.

3. A rotary meter comprising a separable cylindrical casing having an inlet and outlet, a trough in the casing concentric therewith clear of said outlet but having communication with said inlet, a spindle having its bearings in said casing central of the same, means in conjunction with the spindle for operating a register mechanism, a trough-facing drum in vertically-adjustable rigid connection with said spindle, a continuous wave-flange on the periphery of the drum engaging the trough, and a loose gate guided in the casing opposite the end of said trough adjacent to the aforesaid outlet.

4. A rotary meter comprising a separable cylindrical casing having an inlet and outlet, a trough in the casing concentric therewith clear of said outlet but having communication with said inlet, a spindle having its bearings in said casing central of the same, means in conjunction with the spindle for operating a register mechanism, a trough-facing drum fast on said spindle, a continuous wave-flange on the periphery of the drum engaging the trough, a flange extending upward from that end of said trough adjacent to the aforesaid inlet, a rib in the casing parallel to the trough-flange, and a loose gate between said trough-flange and casing-rib having a recess engaged by the drum-flange.

In testimony that I claim the foregoing I have hereunto set my hand, at Milwaukee, in the county of Milwaukee and State of Wisconsin, in the presence of two witnesses.

GUSTAV FAJEN.

Witnesses:
N. E. OLIPHANT,
B. C. ROLOFF.